(No Model.)

J. W. McCLELLAN.
LAWN MOWER.

No. 383,896. Patented June 5, 1888.

WITNESSES:
J. W. Snyder
W. A. Seward

John W. McClellan.
INVENTOR,
by James W. See,
ATTORNEY.

UNITED STATES PATENT OFFICE.

JOHN W. McCLELLAN, OF MIDDLETOWN, OHIO.

LAWN-MOWER.

SPECIFICATION forming part of Letters Patent No. 383,896, dated June 5, 1888.

Application filed March 31, 1886. Serial No. 197,236. (No model.)

*To all whom it may concern:*

Be it known that I, JOHN W. McCLELLAN, of Middletown, Butler county, Ohio, have invented certain new and useful Improvements in Lawn-Mowers, of which the following is a specification.

This invention pertains to lawn-mowers, and has special reference to grass-gathering features.

The improvements will be readily understood from the following description, taken in connection with the accompanying drawings, in which—

Figure 1:
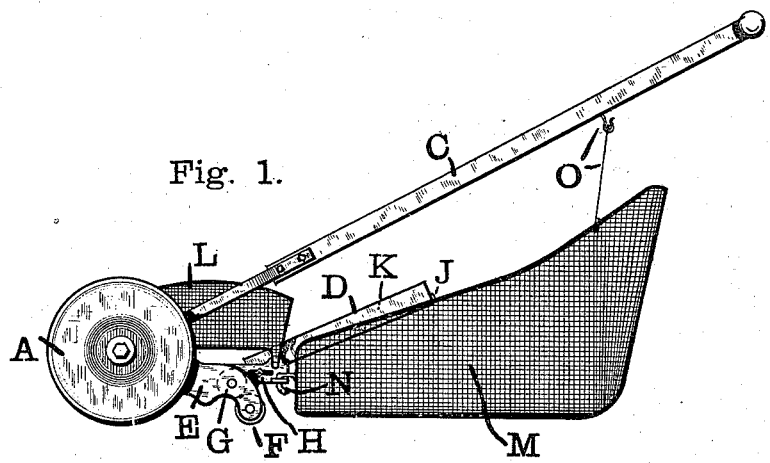
Figure 2:
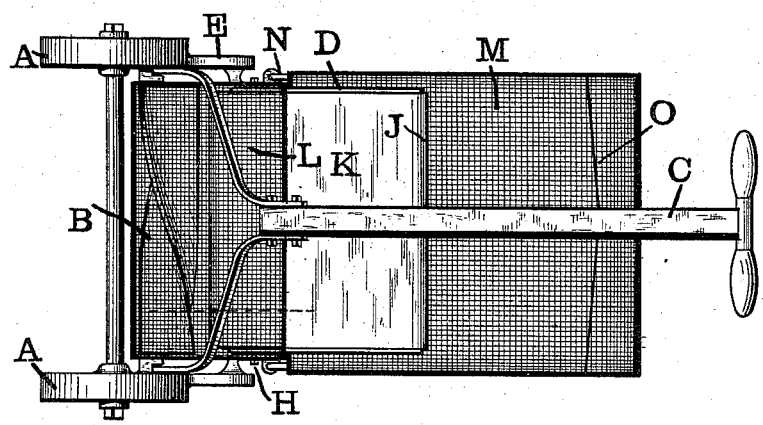
Figures 3, 4:
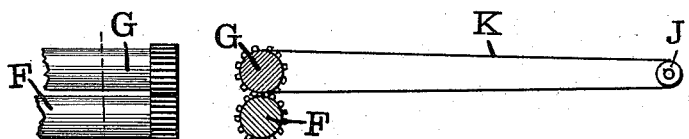

Figure 1 is a side view of an ordinary lawn-mower of common type with my improved grass-gathering device; Fig. 2, a plan of the same; Fig. 3, a transverse section of the apron-rollers and apron, and Fig. 4 a front elevation of the forward apron-rolls.

In the drawings, A indicates the usual wheels of the lawn-mower, by means of which the cutting apparatus is operated, these two wheels being disposed at opposite ends of the axle; B, the rotary helical cutter of the lawn-mower, arranged to be driven in the usual manner from the wheels A; C, the handle by which the machine is pushed; D, a rectangular apron-frame disposed in an angular position at the rear of the cutter and projecting rearwardly beneath the handle; E, the usual rearward projections disposed behind the cutter; F, a roller journaled in these projections, with its axis parallel to the axis of the cutter and arranged to have its periphery rest upon the ground; G, a similar roller arranged over and close to and parallel with the roller F, the two rollers being preferably geared together at their ends, as indicated in Fig. 4; H, bolts securing the apron frame to the rearward projections; E, said bolts engaging through slots in the projection, whereby the apron-frame may be adjusted to and from the roller G; J, a roller journaled in the rearward end of the apron-frame parallel to the roller G; K, an endless apron, as of canvas, carried around the rolls G and J; L, an open-bottomed box-like deflector formed, preferably, of wire-cloth, and disposed directly over the cutter B and projecting over the forward end of the apron, this deflector being attached to the general frame of the lawn-mower; M, a grass-receptacle formed, preferably, of wire-cloth, and disposed at the rear of the lawn-mower below the handle, the receptacle being in the form of an open-topped box open at its forward end and having its rear end of greater depth than its forward end, the width of the receptacle being sufficient to enable its sides to pass up outside the apron-frame; N, hooks formed upon the forward end of the grass-receptacle and engaging eyes in the rearward projections of the lawn-mower, these hooks and eyes serving to support the forward end of the grass-receptacle and to permit of its ready detachment from its supports, and O a bail at the rear of the grass-receptacle engaging a hook in the handle.

The deflector L and grass-receptacle M, when formed of wire-cloth, should have their edges margined with strengthening-wires, forming virtually the framings of the structures. The deflector L by being formed of wire-cloth permits the movements within it to be constantly inspected through the perforations or interstices, whereby clogging may be detected and remedied.

When the machine is pushed forward, the cutter cuts the grass and flings it upward into the deflector, from whose roof it is deflected downward upon the foot of the endless apron which carries the cut grass rearwardly and dumps it into the grass-receptacle. The roller F is caused to revolve by reason of its contact with the ground, and this roller drives the roller G through the medium of its end gearing.

The endless apron is driven by the rotation of the roller G. By means of the bolts H engaging in their slots the apron-frame may be adjusted rearwardly and angularly, whereby the apron may be kept taut and the elevation of the rear end of the apron adjusted. The grass is thus delivered into the receptacle and fairly distributed therein, the newly-arriving grass pushing backward upon that below just to the rear of the apron-frame, and thus serving to fill the entire rear of the receptacle, while the forward motion of the lower leaf of the apron tends to distribute a portion of the cut grass into the forward part of the receptacle below the apron. When the receptacle is filled, the mower with its load of cut grass may be wheeled away to the dumping-ground. Then the receptacle may be removed from the mower by disengaging the bail from its handle-hook and the forward hooks from their eyes. The receptacle, after being dumped of its charge, may be reattached to the mower and the mowing operation proceeded with.

The lawn-mower proper, comprehending the cutting apparatus, the wheels A, the projection E, the roller F, and the handle C, is to be constructed and arranged as usual. The roller G is journaled in projections E. The endless-carrier structure is a separate device removably bolted to the projections E by the bolts H, and its rear is not otherwise supported. The rear end of the carrier with the roller J may thus be adjusted for tension of carrier and for height of delivery.

The roller G pertains to the endless carrier, and in the absence of the carrier would of course not be required. In case the lawn-mower is to be used without the grass-collecting apparatus, generally the roller G may, if desired, be removed when the other collecting parts are removed.

I claim as my invention—

1. The combination, substantially as set forth, of a lawn-mower having rearward projections E, grass-receptacle M, attached at the rear of the lawn-mower, apron-frame D, having rolls and an apron, and bolts engaging said apron-frame and slots in said rearward projections.

2. The combination, substantially as set forth, of a lawn-mower having rearward projections E, rollers F and G, journaled in such projections and having their ends geared together, grass-receptacle M, attached at the rear of the lawn-mower, apron-frame D, roller J, and apron K.

3. The combination, with a lawn-mower provided with a ground-roller in rear of its cutting-knife, of an endless-carrier attachment thereto, the driving-roll of which is connected with and driven by said ground-roller, substantially as described.

JOHN W. McCLELLAN.

Witnesses:
J. W. SEE,
W. A. SEWARD.